(12) United States Patent
Patel

(10) Patent No.: US 12,490,854 B2
(45) Date of Patent: *Dec. 9, 2025

(54) JUICE SEPARATION APPARATUS WITH SUPPORTED FILTERING DEVICE AND NONPERMEABLE PRESS

(71) Applicant: Lotus Pursuits, LLC, New York City, NY (US)

(72) Inventor: Jai Patel, New York, NY (US)

(73) Assignee: Lotus Pursuits, LLC, New York City, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/223,147

(22) Filed: Jul. 18, 2023

(65) Prior Publication Data

US 2023/0355024 A1    Nov. 9, 2023

Related U.S. Application Data

(63) Continuation of application No. 16/844,087, filed on Apr. 9, 2020, now Pat. No. 11,766,150.

(60) Provisional application No. 62/831,582, filed on Apr. 9, 2019.

(51) Int. Cl.
*A47J 19/02*  (2006.01)
*A47J 43/28*  (2006.01)
*B01D 29/13*  (2006.01)

(52) U.S. Cl.
CPC ........... *A47J 19/023* (2018.08); *A47J 43/284* (2013.01); *B01D 29/13* (2013.01)

(58) Field of Classification Search
CPC ...... A47J 19/023; A47J 43/284; A47J 19/005; B01D 29/13; B01D 29/23
USPC .......................................................... 99/495
See application file for complete search history.

(56) References Cited

U.S. PATENT DOCUMENTS

| | | | |
|---|---|---|---|
| 11,766,150 B2 * | 9/2023 | Patel | A47J 19/005 |
| | | | 99/495 |
| 2006/0021524 A1 | 2/2006 | Liu | |
| 2006/0086674 A1 | 4/2006 | Morgan | |
| 2006/0191425 A1 | 8/2006 | Chang | |
| 2014/0356501 A1 * | 12/2014 | Juris | A23F 5/265 |
| | | | 426/433 |
| 2017/0127696 A1 | 5/2017 | Lown | |

* cited by examiner

*Primary Examiner* — Hayden Brewster
(74) *Attorney, Agent, or Firm* — Hall Estill Law Firm

(57) ABSTRACT

A fluid separation apparatus includes a container for capturing liquid juice separated from blended juice. The fluid separation apparatus also includes a filter basket supported by the container. The filter basket includes an upper portion that engages with the container and a cylindrical extension portion that extends from the upper portion. The fluid separation apparatus also has a filtering device that can extend into and through the filter basket. The filtering device is supported by the filter basket at a top end and has a bottom end that extends past the cylindrical extension portion of the filter basket. The fluid separation apparatus has a press assembly having a rod element with a handle disposed on a first end of the rod element and a press disposed on a second end of the rod element.

12 Claims, 7 Drawing Sheets

JUICE SEPARATION APPARATUS WITH SUPPORTED FILTERING DEVICE AND NONPERMEABLE PRESS

CROSS-REFERENCE TO RELATED APPLICATIONS

The present application is a continuation application of U.S. patent application Ser. No. 16/844,087, filed Apr. 9, 2020, which is a conversion of U.S. Provisional Application having U.S. Ser. No. 62/831,582, filed Apr. 9, 2019, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to an apparatus for separating liquids from fibrous materials. More specifically, the present disclosure relates to juice separation apparatus for separating liquid juice from blended or otherwise crushed vegetables and/or fruit fibers.

2. Description of the Related Art

Typically, household juicing machines are used to make juice drinks from fruits and vegetables. These juicing machines are stand-alone devices used specifically and exclusively for making juice and can be expensive kitchen utensils. They generally crush or grind vegetables/fruits while separating the fibrous material producing a final product of liquid juice. An alternative method to crush vegetables/fruits is to use a blender. Blenders, with their wide range of uses, are typically a standard kitchen appliance already found within a kitchen. Blenders can be used to liquefy vegetables and fruits but the resulting product is a mix of juice the vegetable/fruits fibrous materials.

Accordingly, there is a need for an apparatus that can be used on the blended juice to remove the fibrous materials from the blended juice.

SUMMARY OF THE DISCLOSURE

The present disclosure is directed toward a fluid separation apparatus. The apparatus includes a container for capturing liquid juice separated from blended juice. The fluid separation apparatus also includes a filter basket supported by the container. The filter basket includes an upper portion that engages with the container and a cylindrical extension portion that extends from the upper portion. The fluid separation apparatus also has a filtering device that can extend into and through the filter basket. The filtering device is supported by the filter basket at a top end and has a bottom end that extends past the cylindrical extension portion of the filter basket. The fluid separation apparatus has a press assembly having a rod element with a handle disposed on a first end of the rod element and a press disposed on a second end of the rod element.

DETAILED DESCRIPTION OF THE DISCLOSURE

Figure 1:
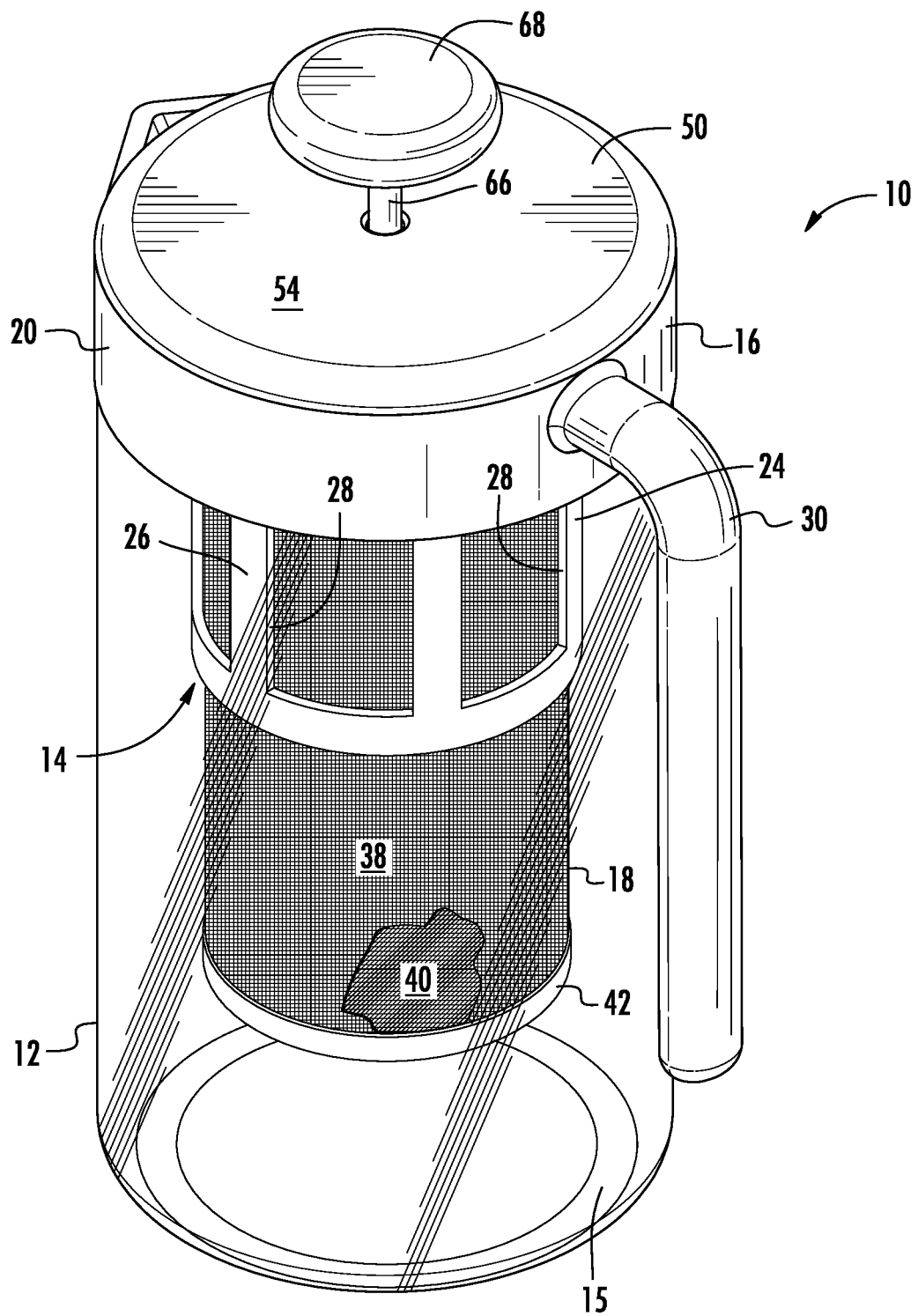
FIG. 1 is a perspective view of a juice separation apparatus constructed in accordance with the present disclosure.
Figure 2:
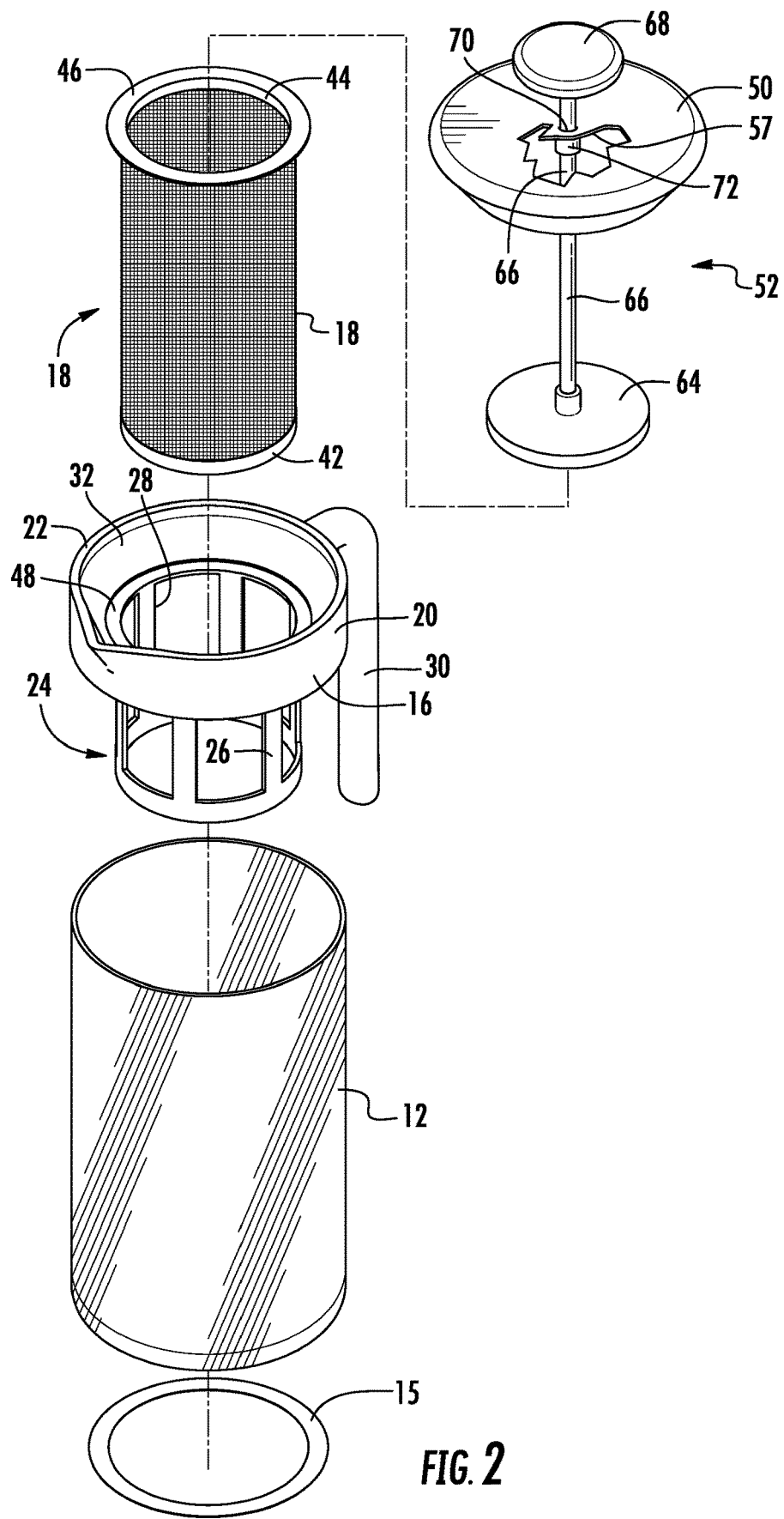
FIG. 2 is an exploded view of the juice separation apparatus constructed in accordance with the present disclosure.
Figure 3:
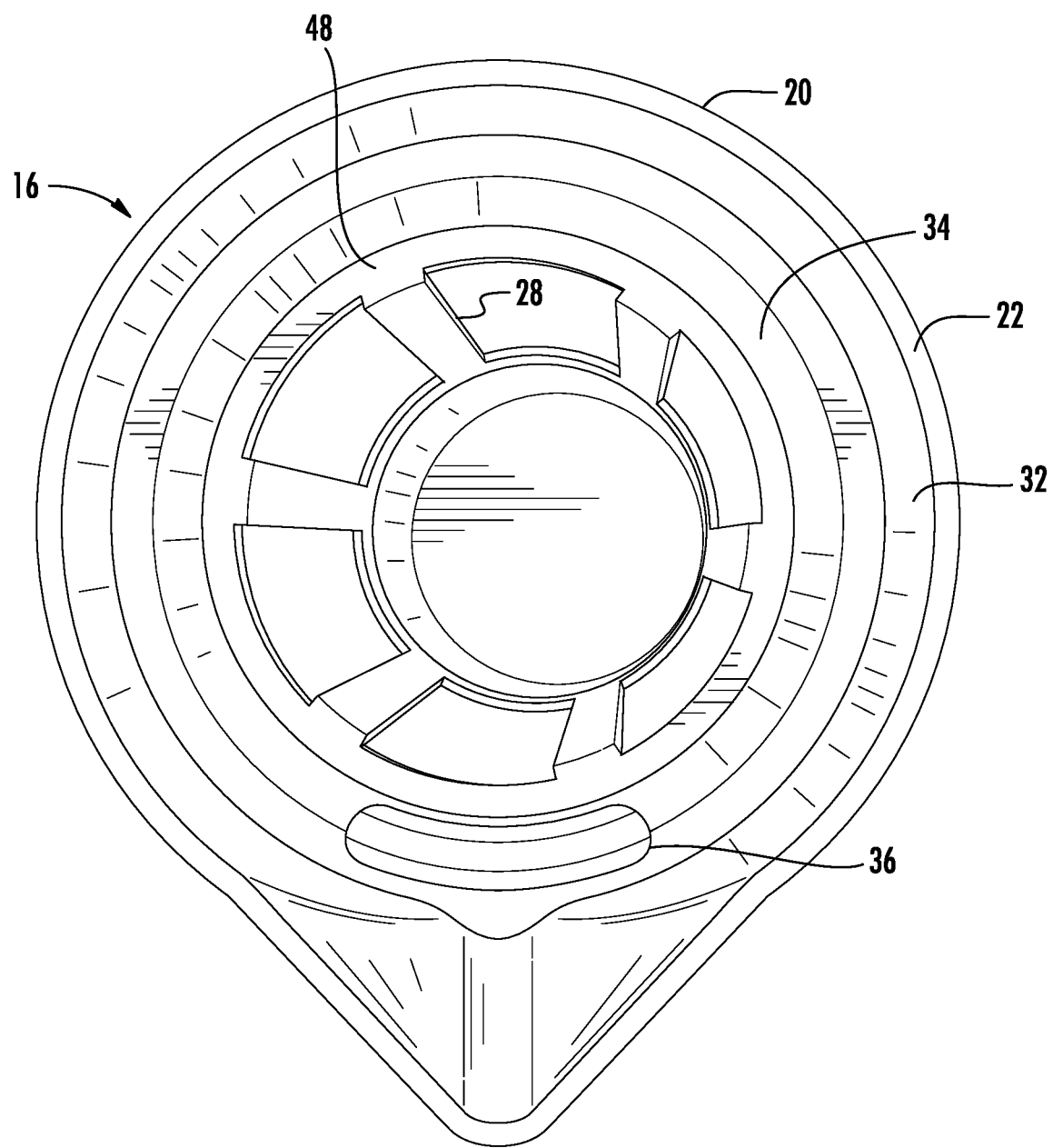
FIG. 3 is a top elevation view of a portion of the juice separation apparatus constructed in accordance with the present disclosure.
Figure 4A:
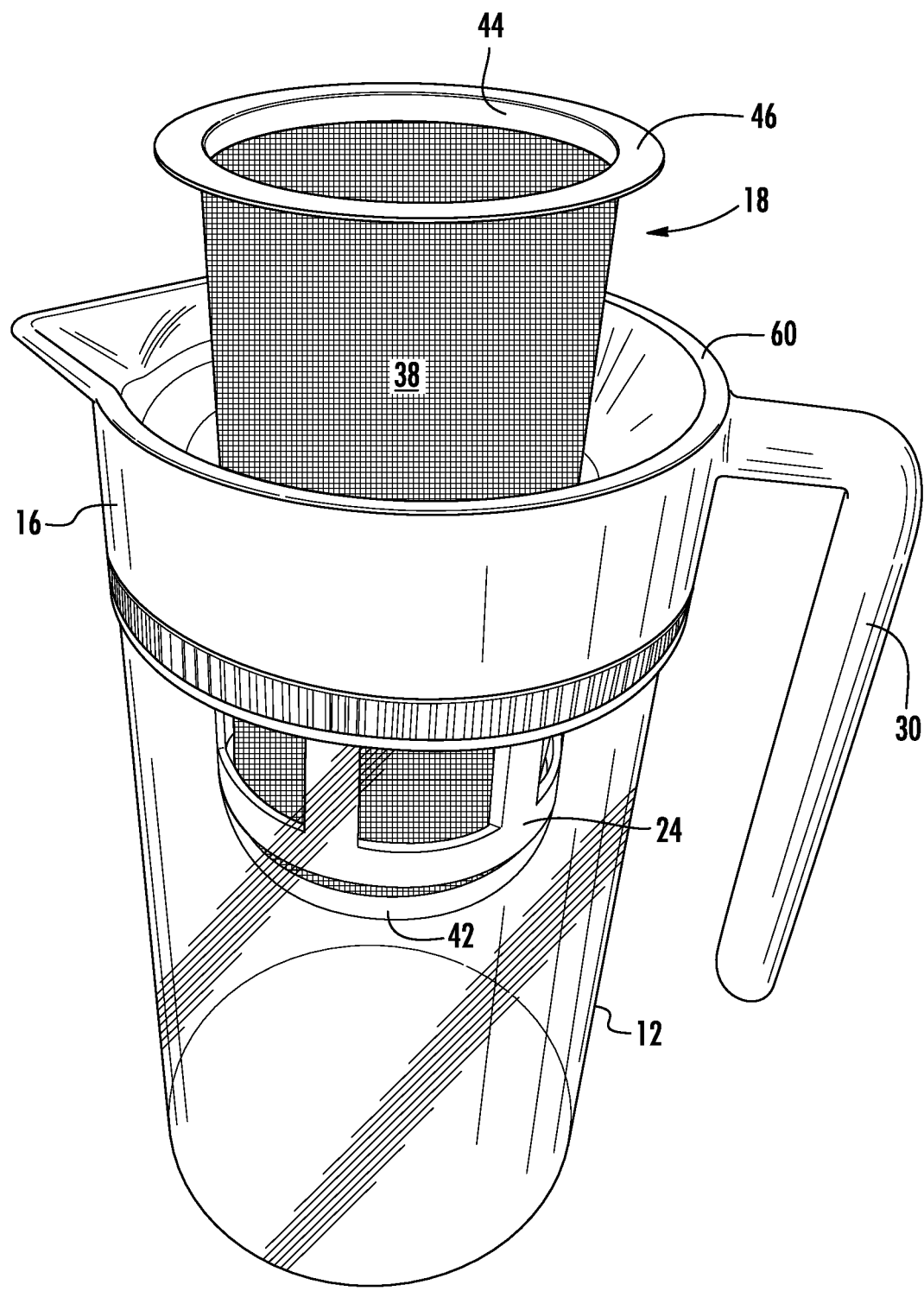
FIG. 4A is a close-up, perspective view of a portion of the juice separation apparatus shown in FIG. 1 constructed in accordance with the present disclosure.
Figure 4B:
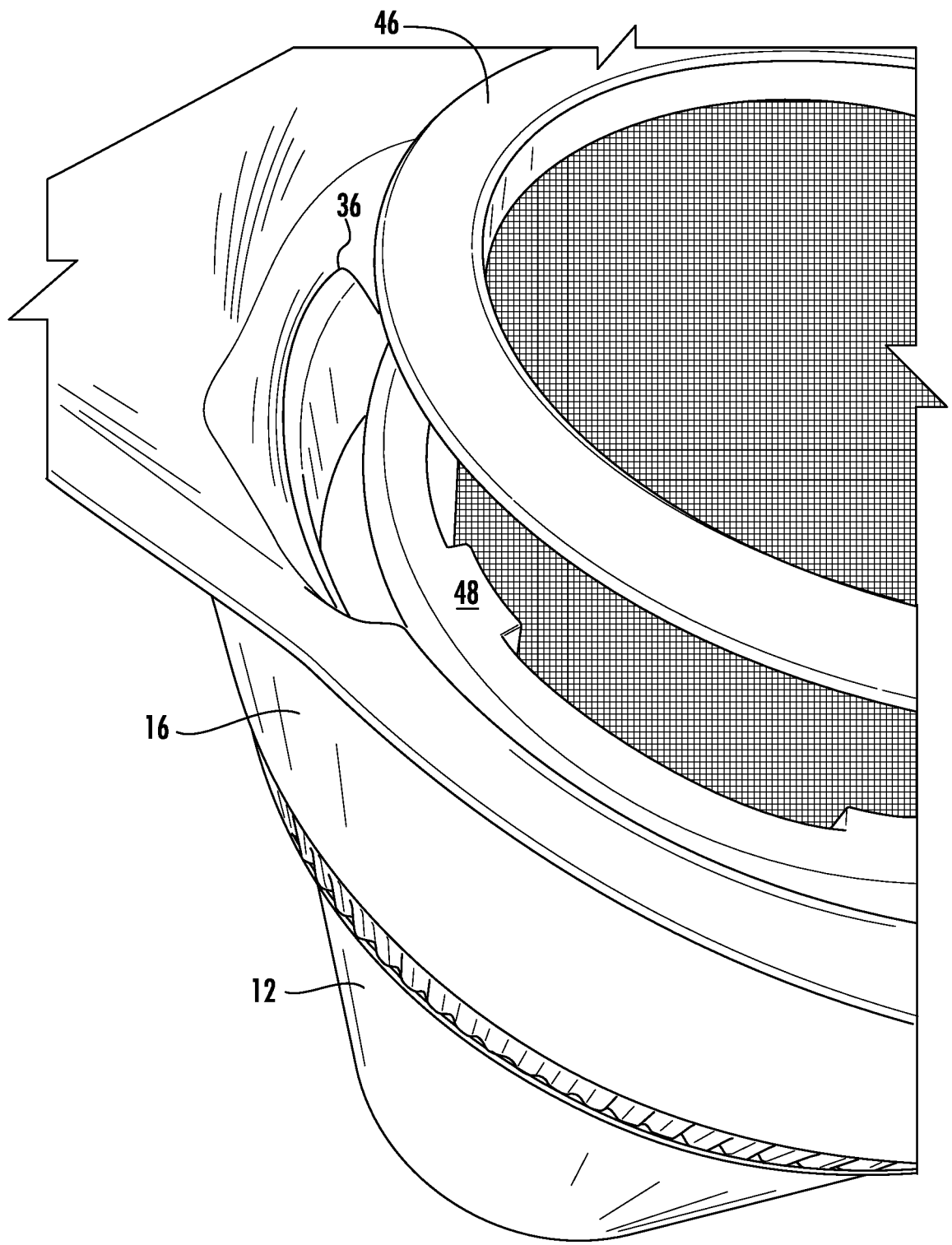
FIG. 4B is another close-up, perspective view of the portion of the juice separation apparatus shown in FIG. 4A constructed in accordance with the present disclosure.
Figure 5:
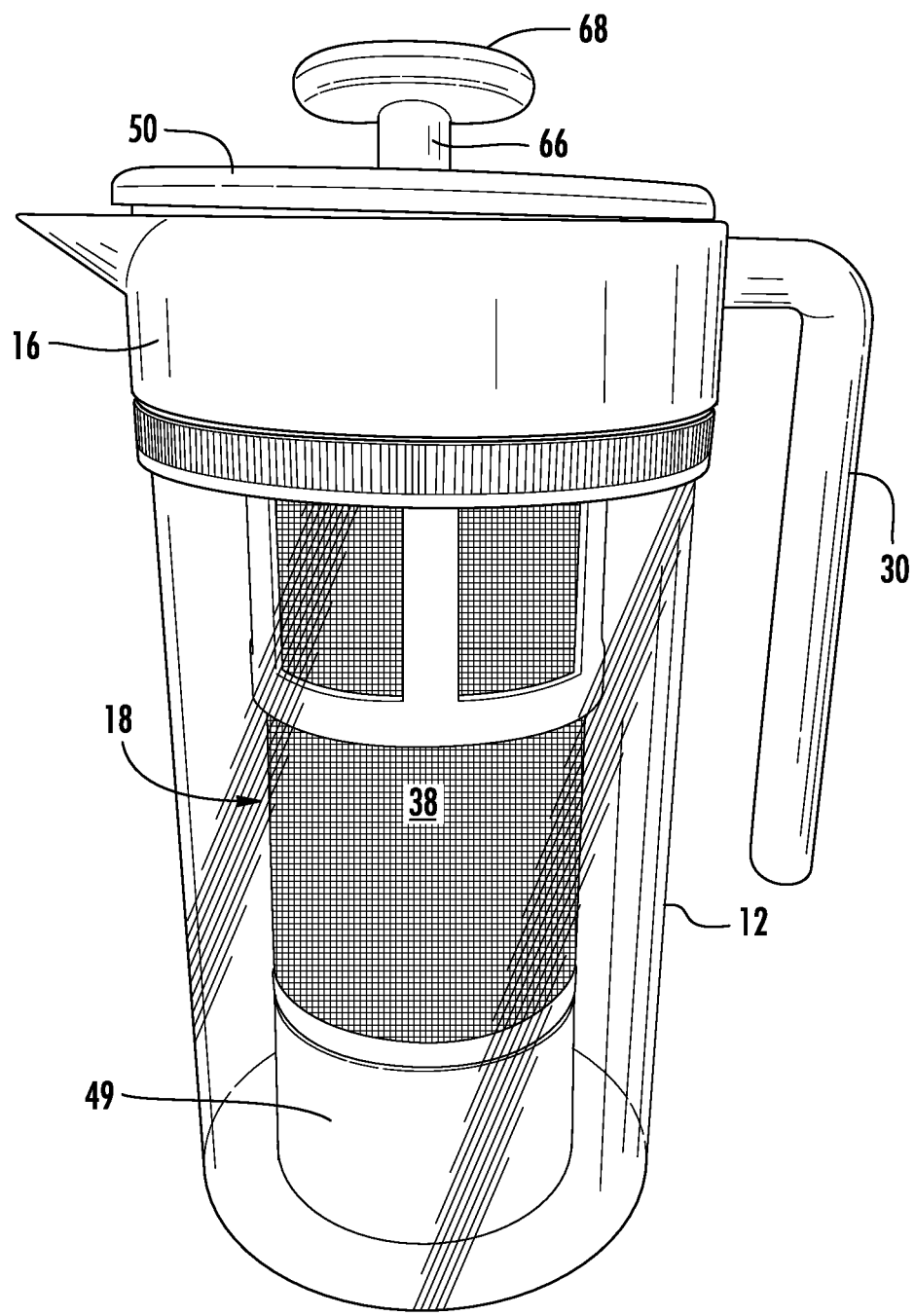
FIG. 5 is a side elevation view of the juice separation apparatus constructed in accordance with the present disclosure.

Referring now to FIGS. 1-6, the present disclosure is directed to a juice separation apparatus 10 for separating liquid juice from fibrous materials present in blended juice. The juice separation apparatus 10 is constructed of various components. The juice separation apparatus 10 can include a container 12 to support and/or hold other components of the juice separation apparatus 10 and retain the liquid juice separated from the fibrous materials of the blended juice. The container 12 can be made of any material, such as plastic or glass, and have any shape, such as cylindrical, so that it functions as desired. The juice separation apparatus 10 can also include a filter assembly 14 supported by the container 12 to prevent fibrous materials to pass therethrough and permit the liquid juice to pass through but not the fibrous materials. The container 12 can have a non-slip ring 15 disposed on the bottom to prevent the juice separation apparatus 10 from sliding around on a countertop.

The filtering assembly 14 can include a filter basket 16 to engage with the container 12 and support a filtering device 18. The filter basket 16 has an upper portion 20 that extends radially to engage with an upper rim 22 of the container 12 and a cylindrical extension portion 24 that extends from the upper portion 20, both of which have an opening extending therethrough. The cylindrical extension portion 26 can have a sidewall 16 to support the filtering device 18. In one embodiment, the sidewall 16 can have a series of hollowed-out portions 28 that can ben be evenly spaced in the sidewall 16. A handle 30 can be attached to the filter basket 16 or the container 12 to allow a user of the juice separation apparatus 10 to hold the juice separation apparatus 10 and pour liquid juice therefrom. The upper portion 20 of the filter basket 16 can have an internal side 32 with a flange element 34 extending radially inward. Disposed in the flange element 34 is a pour spout 36 for allowing liquid juice in the container 12 to be poured from the juice separation apparatus 10. In addition to the pour spout 36, the upper portion 20 or the flange element 34 can have other openings disposed therein to permit air to flow out of the container 12 when the juice separation apparatus 10 is in use. The pour spout 36 can be positioned such that the handle 30 is positioned on an opposite side of the upper portion 20 of the filter basket 16. The internal side 32 of the upper portion 20 of the filter basket slopes inward toward the flange element 34.

The filtering device 18 can be cylindrically shaped with a mesh sidewall 38 and a mesh bottom 40 for capturing the fibrous material and preventing the fibrous material in the blended juice from passing through into the container 12. The mesh of the mesh sidewall 38 and the mesh bottom 40 can be a double weave, super fine mesh and made of a metallic material. The filtering device 18 can have a band 42 disposed at the bottom to support the mesh sidewall 38 and the mesh bottom 40. In one embodiment, the band 42 has an L-shaped cross sectional shape so that the mesh sidewall 38 and the mesh sidewall 40 can more easily be secured thereto. The filtering device 18 can also include a top rim 44 for providing structure to a top portion of the mesh sidewall 38 and for engaging with the filter basket 16 to maintain the position of the filtering device 18 in the juice separation apparatus 10 when the juice separation apparatus 10 is being used to separate blended juice into liquid juice and the fibrous materials. The top rim 44 can have a flange 46 extending outward that can engage with a ledge portion 48 extending from the flange element 34 to prevent the filtering device 18 from falling down into the container 12. In an alternative embodiment of the present disclosure shown in FIG. 5, the container 12 can also include a ledge 49 in the bottom of the container 12 for supporting the filtering device 18.

The open top and bottom of the filter basket 16 allows the filtering device 18 to be passed partially down into the container 12. The sidewalls 24 of the filter basket 16 provide support for keeping the filtering device 18 in place while the juice separation apparatus 10 is in use. The ledge portion 48 of the flange element 34 of the filter basket 16 can be stepped down from the top part of the flange element 34 so that the top of the flange 46 of the top rim of the filtering device 18 is flush with the top part of the flange element 34. This feature combined with the slope of the internal side 32 of the upper portion allows for blended juice poured into the juice separation apparatus 10 to be directed toward the filtering device 18.

Figure 6:
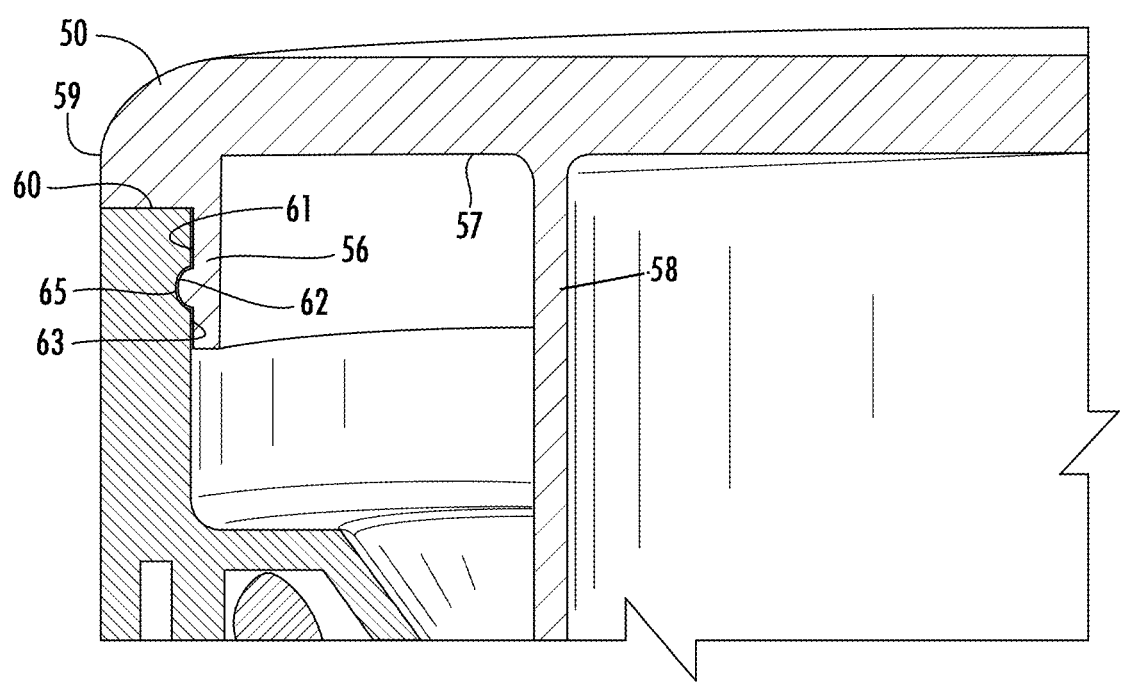
FIG. 6 is a cross-sectional view of a portion of the juice separation apparatus constructed in accordance with the present disclosure.

The juice separation apparatus 10 can also include a lid 50 and a press assembly 52. The lid 50 is designed to fit atop the filter basket 16. FIG. 6 shows one embodiment how the lid 50 can be secured to the filter basket 16. The lid 50 can have a plate portion 54 and a ridge portion 56 extending from a bottom side 57 of the plate portion 54. The ridge portion 56 runs around the bottom side 57 of the lid a short distance from the outer edge 59 of the lid 50, thus the ridge portion 56 has a circumference less than the circumference of the outer edge 59 of the lid 50. The ridge portion has an outer side 61 that has a protrusion 62 disposed thereon for frictionally engaging an inside portion 63 of an upper rim part 60 of the upper portion 20 of the filter basket 16. In one embodiment, the protrusion 62 can run around a majority of the circumference of the other side 61 of the ridge portion 56. In another embodiment, the protrusion 62 can run around the entire circumference of the outer side of the ridge portion 56. In yet another embodiment, the inside part 63 of the upper rim 60 includes a recessed portion 65 for matingly engaging with the protrusion 62 disposed on the outer side 61 of the ridge portion 56. The recessed portion 65 can run around the inner circumference of the inside part 63 of the upper rim 60 except where the pour spout 36 is disposed. In an alternative embodiment, the recessed portion can be disposed on the outer side 61 of the ridge portion 56 and the protrusion can be disposed on the inside part 63 of the upper rim 60. The lid 50 can also be contoured down and inwards. This allows the lid 50 to sit flush into the filter basket 16. The lid 50 can also include a sleeve portion 58 extending from the bottom side 57 of the lid 50 that can contact the top of the flange 46 of the top rim 44 of the filtering device 18 to hold the filtering device 18 in place in the filter basket 16 and container 12 when liquid juice is poured from the container 12.

The press assembly 52 includes a press or plunger 64 attached on one end of a rod element 66 and a handle 68 attached to the other end of the rod element 66. The rod element 66 extends through an opening 70 in the lid 50 wherein the lid 50 can slide up and down on the rod element 66 and the rod element 66 can slide up and down in the opening 70 of the lid 50. The opening 70 designed so that the rod element 66 is securely slidable therein. The lid 50 can have a conduit protrusion 72 extending from the bottom of the lid 50 in alignment with the opening 70 to provide additional support to the rod element 66 when the press assembly 52 is used. The press 64 is sized such that its outer diameter is just barely smaller than the inner diameter of the filtering device 18 so that blended juice is prevented from traveling between the filtering device 18 and the press 64 when downward force is applied to the press assembly 52. In one embodiment, the press 64 is flat across the bottom so that it provide uniform distribution of pressure across the blended juice. The handle 68 provides the user of the juice separation apparatus 10 something to grab. The press 64 is designed so that it can be pressed into the blended juice in the filtering device 18 to force the liquid juice through the mesh portions 38 and 40 and into the container 12.

In operation, the filtering device 18 is placed into the filter basket 16 within the container 12. Blended juice is poured into the juice separation apparatus 10. The press assembly 52 can then be inserted into the juice separation apparatus 10 and the handle 68 can be forced downwards, which forces the press 64 to contact the blended juice and force the liquid juice through the mesh portions 38 and 40 of the filtering device 18. The user can then pour the liquid juice from the container 12 via the pour spout 36 disposed in the flange element 34 of the filter basket 16. It should be understood and appreciated that the liquid juice can be poured from the juice separation apparatus 10 without having to remove the press assembly 52 from the container 12. After the press operation has finished, the filtering device 18 and press assembly 52 can be removed from the juice separation apparatus 10 for cleaning all the components of the juice separation apparatus 10.

In an alternative embodiment, The juice separation apparatus 10 could be designed to leverage a "pulling" action (vs pushing). One variation of this is having the blended juice poured into the filtering device 18 on top of the press 64, which has already been pushed to the bottom of the filtering device 18. The press 64 could be a double weaved super fine mesh material (similar to the sidewalls of the filtering device 18 described above). The lid 50 or another non-perforated surface can act as the barrier to which when the blended juice are "pulled" upwards into and the resistance from the barrier forces the liquid downwards through the press 64 made of mesh. The remaining fibrous materials and non-liquid materials will remain between the press 64 bottom and the barrier surface which can be removed prior to pouring the contents out of the container 12.

In an alternative embodiment, the press 64 can be made from the double weave mesh spanning the width of the container 12; sitting flush against the inside walls of the container 12 and providing a tight seal. A pressing action forces the blended juice to the bottom allowing the liquid to surface to the top. The filtering device 18 and press 64 can also be removed and used independently of the container. The lid 50 could be detached from rod element 66 as a distinct piece allowing the lid 50 to close the container 12 without requiring the press 64. The filtering device 18 could be made wider and longer.

The volume of the container 12 could vary in size. The container 12 dimensions could also be altered to be shorter and wider or taller and narrower. The filtering device 18 & filter basket 16 and pour spout 36 could be designed as a single connected piece. The angle of the spout 36 facing inwards and down towards the filter could made steeper. The lid 50 could be attached to the handle 30 and opened along a pivot point or spring and thus the press 64 would be used when the handle 30 is opened. The press 64 and filtering device 18 could be a single contained unit/piece The juice separation apparatus 10 could also be used to separate liquid from blended vegetable and/or fruit juice (or otherwise crushed). Other uses include, but not limited to, are infusing and subsequently separating coffee or tea grinds from the liquid, infusing fruits or vegetables into liquids by way of the filter, soaking beans, rice lentils or other grains, and mixing liquids together From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A fluid separation apparatus, the apparatus comprising:
   a container for capturing liquid juice separated from a blended juice mixture made of liquid juice and fibrous materials;
   a filtering device that can extend into a portion of the container, the filtering device is supported by the container at a top end and has a bottom end; and
   a press assembly having a rod element with a handle disposed on a first end of the rod element and a press disposed on a second end of the rod element, the press of the press assembly being entirely nonpermeable, free of openings and slidably disposed within an entire depth of the filtering device.

2. The fluid separation apparatus of claim 1 further comprising a lid having an opening disposed therein for the rod element to be slidably disposed therein.

3. The fluid separation apparatus of claim 2 wherein the lid has a ridge portion extending from a bottom side of the lid, the ridge portion having a circumference less than an outer edge of the lid and a protrusion disposed from an outer side of the ridge portion to frictionally engage an upper rim part of the upper portion of a filter basket.

4. The fluid separation apparatus of claim 3 wherein an inside part of the upper rim part of the upper portion of the filter basket includes a recessed area to matingly engage with the protrusion disposed on the ridge portion of the lid.

5. The fluid separation apparatus of claim 3 wherein an upper portion of a filter basket includes a flange element that extends inward from an internal side of the upper portion of the lid.

6. The fluid separation apparatus of claim 5 wherein the flange element includes a pour spout disposed therein to permit liquid juice to be poured from the container.

7. The fluid separation apparatus of claim 6 wherein the flange element further includes additional openings disposed therein to permit air to escape the container when the fluid separation apparatus is in use.

8. The fluid separation apparatus of claim 1 wherein the filtering device includes a mesh sidewall, a mesh bottom, a band disposed on a lower end of the filtering device to secure a lower portion of the mesh sidewall to the mesh bottom, and a top rim connected to a top part of the mesh sidewall.

9. The fluid separation apparatus of claim 3 wherein the filter basket or the container has a handle disposed thereon.

10. The fluid separation apparatus of claim 8 wherein the press of the press assembly is flat across an entire bottom portion of the press and has an outer diameter that is slightly less than an inner diameter of the mesh sidewall of the filtering device.

11. The fluid separation apparatus of claim 2 wherein the lid has a sleeve portion extending from a bottom side of the lid that contacts the filtering device and holds the filtering device in position relative to the container when liquid juice is poured from the container.

12. The fluid separation apparatus of claim 8 wherein the top rim of the filtering device includes an outwardly directed flange that engages a ledge portion of the flange element of the filter basket to support the filtering device.

* * * * *